United States Patent [19]

Kajitani et al.

[11] Patent Number: 4,573,945

[45] Date of Patent: Mar. 4, 1986

[54] DAMPER DISC OF A LONG TRAVEL TYPE

[75] Inventors: Kouji Kajitani; Hirotaka Fukushima, both of Neyagawa, Japan

[73] Assignee: Kabushiki Kaisha Daikin Seisakusho, Osaka, Japan

[21] Appl. No.: 681,316

[22] Filed: Dec. 13, 1984

[30] Foreign Application Priority Data

Dec. 22, 1983 [JP] Japan ................................ 58-243146

[51] Int. Cl.[4] .............................................. F16D 3/14
[52] U.S. Cl. .................................... 464/68; 192/106.2
[58] Field of Search ............... 192/70.17, 106.1, 106.2; 464/64, 66, 68

[56] References Cited

U.S. PATENT DOCUMENTS

| | | | |
|---|---|---|---|
| 2,574,573 | 11/1951 | Libby | 464/68 |
| 3,327,820 | 6/1967 | Maurice | 192/106.2 X |
| 4,304,107 | 12/1981 | Fall et al. | 464/64 |
| 4,485,909 | 12/1984 | Gatewood | 464/68 X |
| 4,493,674 | 1/1985 | Tamura et al. | 464/68 |
| 4,494,642 | 1/1985 | Hashimoto | 464/68 X |
| 4,499,981 | 2/1985 | Nagano | 192/106.2 |

FOREIGN PATENT DOCUMENTS

| | | | |
|---|---|---|---|
| 57-61826 | 4/1982 | Japan | 192/106.2 |
| 2083166 | 3/1982 | United Kingdom | 464/68 |

Primary Examiner—Stuart S. Levy
Assistant Examiner—Daniel P. Stodola
Attorney, Agent, or Firm—Burns, Doane, Swecker & Mathis

[57] ABSTRACT

A damper disc of a long travel type has a hub adapted to be connected to an output shaft; circumferentially spaced flanges projecting radially outwardly from the outer periphery of the hub; a pair of side plates connected to a torque input portion, disposed at both sides of the flanges and rotatably fitted around the hub; spacers circumferentially spaced to the flanges; sub-plates rigidly holding the spacers and rotatably fitted around portions of the hub between the side plates and the flanges; a first friction member having a small friction force and disposed between the flange and the sub-plate; a second friction member having a large friction force and disposed between the sub-plate and the side plate; a first spring always circumferentially connecting the flange and the side plates; a second spring adapted to circumferentially connect the flange and the spacers in a second torsion operation in which a relative torsion angle between the flange and the side plates is larger than a predetermined value; and a third spring adapted to connect the spacers and the side plate at least in the second torsion operation.

6 Claims, 14 Drawing Figures

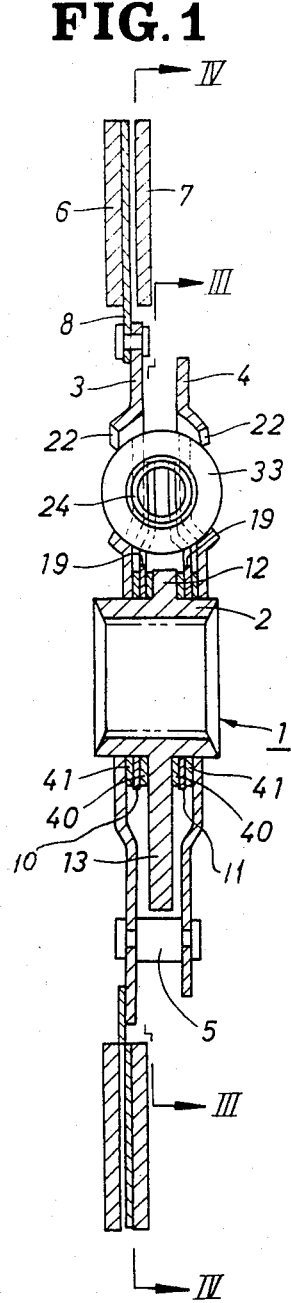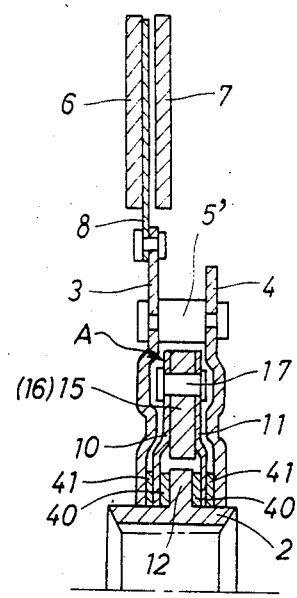

DAMPER DISC OF A LONG TRAVEL TYPE

BACKGROUND AND SUMMARY OF THE INVENTION

The present invention relates to a damper disc of a long travel type, i.e., having a large torsion angle, which can be used as a clutch disc of a dry type or a wet type and also can be used as a clutch disc of a lock-up clutch assembled in a torque converter for an automobile and others.

A damper disc of a long travel type has already been disclosed in the Japanese Utility Model Application No. 57-10387 (U.S. Patent Application Ser. No. 421,338). In this known disc, a hub flange means is divided into an inner flange and an outer flange. Both flanges are circumferentially connected by spring, and the outer flange is circumferentially connected to side plate by springs, so that a torsion angle between the inner flange and the side plate becomes larger than that of conventional discs having undivided flanges. However, in the known disc of the long travel type, a hysteresis torque caused by a friction between disc members is set high and constant in any twisted (torsionally turned) position. Therefore, if the disc is used as a clutch disc of a dry type for an automobile, a torque vibration of an engine in an idling driving can not sometimes be absorbed sufficiently and is transmitted to a driving mechanism such as a transmission, so that gear attacking noises may be generated in the driving mechanism.

Accordingly, it is an object of the invention to provide an improved damper disc, overcoming the above-noted disadvantages, which comprises a hub adapted to be connected to an output shaft; circumferentially spaced flanges projecting radially outwardly from the outer periphery of the hub; a pair of side plates connected to a torque input portion, disposed at both sides of the flanges and rotatably fitted around the hub; spacers circumferentially spaced to the flanges; sub-plates rigidly holding the spacers and rotatably fitted around portions of the hub between the side plates and the flanges; a first friction member having a small friction force and disposed between the flange and the sub-plate; a second friction member having a large friction force and disposed between the sub-plate and the side plate; a first spring always circumferentially connecting the flange and the side plates; a second spring adapted to circumferentially connect the flange and the spaces in a second torsion operation in which a relative torsion angle between the flange and the side plates is larger than a predetermined value; and a third spring adapted to connect the spacers and the side plate at least in the second torsion operation.

Other and further objects, features and advantages of the invention will appear more fully from the following description of the preferred embodiments of the invention.

BRIEF DESCRIPTION OF THE DRAWINGS

FIG. 1 is a sectional view of a damper disc according to an embodiment of the invention;

FIG. 2 is an another sectional view of a damper disc of FIG. 1;

DETAILED DESCRIPTION OF THE PREFERRED EMBODIMENTS

Figure 3:
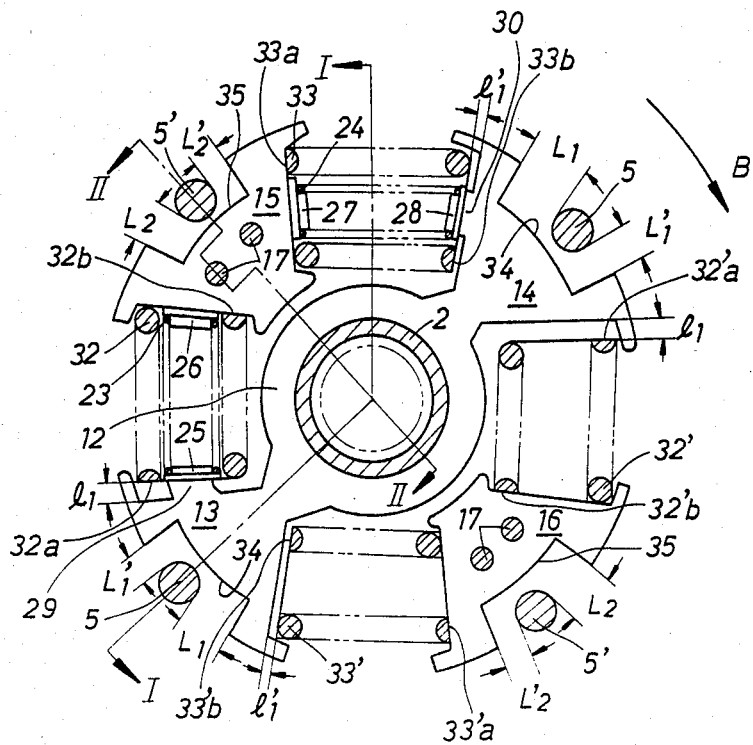
FIG. 3 is a schematic sectional view taken along a line III—III in FIG. 1.

FIG. 1 illustrates a damper disc according to the invention, which is used as a clutch disc of a dry type for a friction clutch of an automobile. In FIG. 1, a clutch disc 1 includes a hub 2 adapted to be splined to an output shaft or a main drive shaft (not shown) which is connected to a transmission. A pair of an annular side plates 3 and 4, which are a clutch plate and a retaining plate, are rotatably fitted onto the outer periphery of the hub 2 and are rigidly fixed together by stop pins 5 and 5' (FIG. 2). A pair of annular friction facings 6 and 7 are fixed to respective surfaces of cushioning plates 8 which are fixed to the radially outer portion of the side plate 3. The friction facings 6 and 7 are faced to a flywheel (not shown) of an engine and a pressure plate (not shown), respectively.

Figure 9:
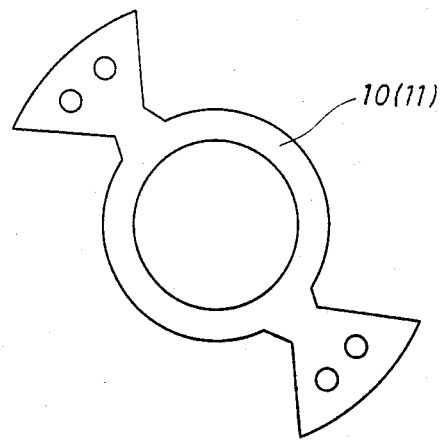
FIG. 9 is a schematic elevation view of a sub-plate.

A pair of sub-plates 10 and 11, of which shape is clearly illustrated in FIG. 9, are rotatably fitted onto the outer periphery of the hub 2, and are disposed respectively between the side plates 3 and 4 and a radial flange 12 which is integrally provided on the hub 2. Annular wave washers 40 or other friction members are interposed respectively between the flange 12 and the sub-plates 10 and 11. Annular friction washers 41 or other friction members 41 are interposed respectively between the sub-plates 10 and 11 and the side plates 3 and 4. Friction force of the washers 40 are set smaller than that of the washers 41.

As shown in FIG. 3, a pair of radial arms or flanges 13 4, which have a same thickness as the flange 12, are integrally and oppositely projected from the flange 12. Spacers 15 and 16 having a same thickness are disposed in the respective circumferential spaces between the flanges 13 and 14. As shown in FIG. 2, the spacers 15 and 16 are pinched from both sides by the sub-plates 10 and 11 and are rigidly fixed thereto by rivets 17 to form a combined body A as a whole.

Figure 4:
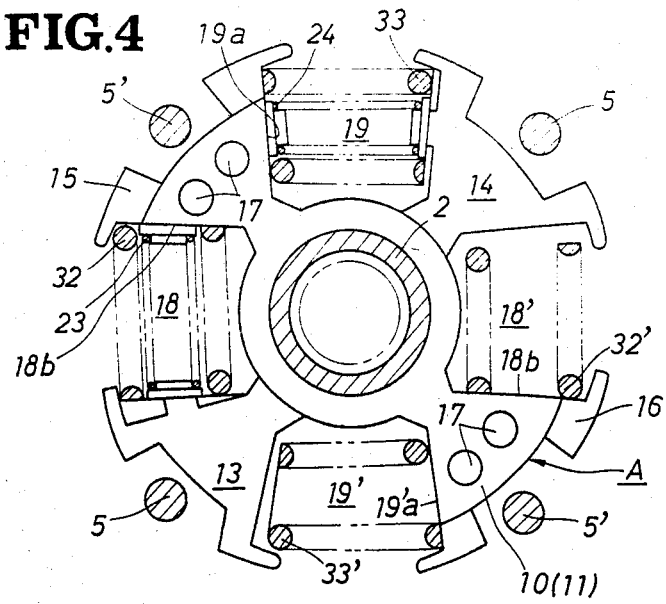
FIG. 4 is a schematic sectional view taken along a line IV—IV in FIG. 1.
Figure 5:
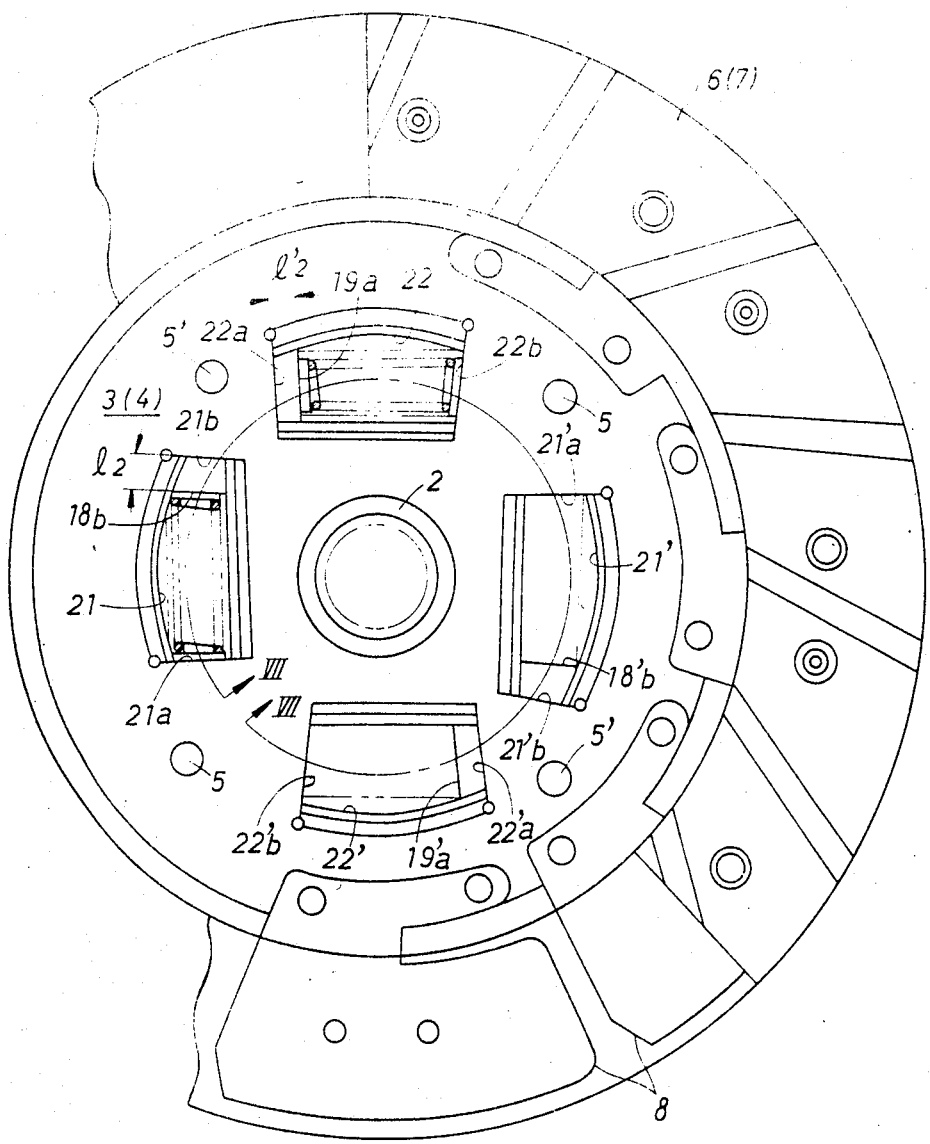
FIG. 5 is a schematic elevation view of a part of a disc of FIG. 1.

As shown in FIG. 4, spaces or openings 18, 18', 19 and 19' are formed between the flanges 13 and 14 and the spacers 16 and 17 of the combined body A. As shown in FIG. 5, the side plates 3 and 4 are provided with openings 21, 21', 22 and 22' registered to above openings. Referring to FIG. 3, 23 and 24 indicate torsion springs which are compressible coil springs having small diameters and small spring constant. Spring seats 25 and 26 are fitted or engaged into the ends of the spring 23. Spring seats 27 and 28 are fitted or engaged into the ends of the spring 24. The spring seats 25 and 28 are seated on circumferential projections 29 and 30 formed on the edges of the flanges 13 and 14, respectively. The spring seats 26 and 27 are seated on the edges of the spacer 15.

32, 32', 33 and 33' indicate torsion springs which are compressible coil springs having large diameters and large spring constant. The spring 32 is arranged coaxially around the spring 23 and between the flange 13 and the spacer 15. The spring 33 is arranged coaxially around the spring 24 and between the flange 14 and the spacer 15. The springs 32' and 33' are disposed between the flange 14 and the spacer 16 and between the flange 13 and the spacer 16.

Figure 6:
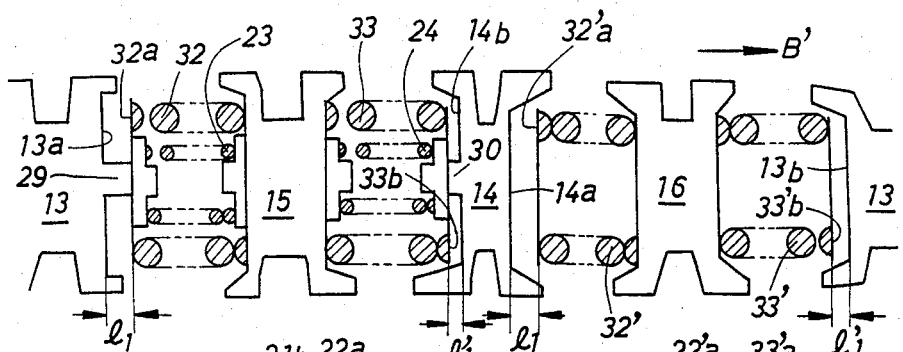
FIG. 6 is a schematic and linearly developed elevation view of a part of a disc of FIG. 1.

Referring to FIG. 6, circumferential spaces 11 are formed between the end 32a of the spring 32 and the edge 13a of the flange 13 and between the end 32'a of the spring 32' and the edge 14a of the flange 14, respectively. Spaces 11' circumferentially shorter than the spaces 11 are formed between the end 33b of the spring 33 and the edge 14b of the flange 14 and between the end 33'b and the edge 13b of the flange 13.

The above structures are also clearly illustrated in FIGS. 7a–7f, in which the wave washers 40 and the friction washers 41 are illustrated on a same section as the springs for following descriptions.

Figure 7A:
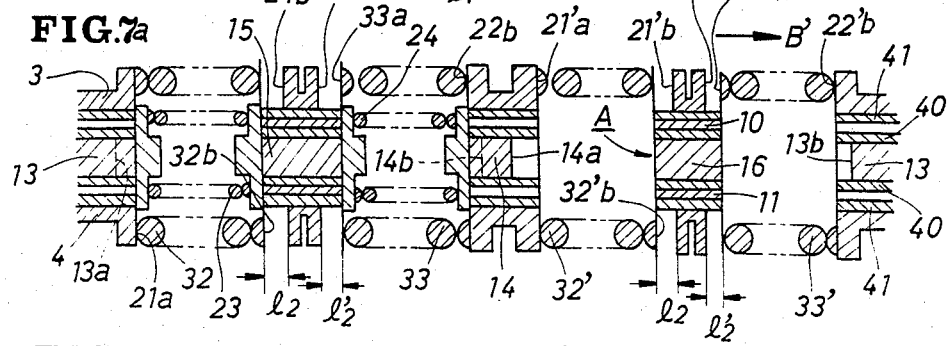
FIGS. 7a–7f are schematic sectional views of a part of a disc taken along a line VII—VII in FIG. 5, respectively in different conditions.

As shown in FIG. 7a illustrating a neutral condition, the springs 23 and 24 are seated at both ends on the edges of the flanges 13 and 14 and the spacers 15 and 16 through the spring seats. The ends of the springs 32, 32', 33 and 33' are seated on the edges of the spacers 15 and 16 or the edges of the openings of the side plates 3 and 4. Circumferential spaces 12 are formed between the end 32b of the spring 32 and the edge 21b of the opening 21 and between the end 32'b of the spring 32' and the edge 21'b of the opening 21'. Spaces 1'2 circumferentially shorter than the space 12 are formed between the end 33a of the spring 33 and the edge 22a of the opening 22 and between the end 33'a of the spring 33' and the edge 22'a of the opening 22'.

As shown in FIG. 3, the flanges 13 and 14 are provided at the outer peripheral portions with recesses 34 through which the stop pins 5 extends, respectively. The spacers 15 and 16 are provided at the outer peripheral portions with recesses 35 through which the stop pins 5' extend. Circumferential spaces L1 and L1' are formed between each stop pins 5 and the edges of the recess 34. Circumferential spaces L2 and L2' are formed between each stop pins 5' and the edges of the recess 35. When the spaces are converted into torsion angles, they have following relationships. $L1 \approx 11 + 212$. $L2 = 12$.

An operation of the above structures are as follows. Referring to FIG. 1, when the pressure plate presses the facing 7 against the flywheel, the torque of the engine is transmitted from the facings 6 and 7 through the cushioning plates 8 to the side plates 6 and 7, and then, is transmitted through the springs, the friction members and sub-plates 10 and 11 to the hub 2, and then to the output shaft. Although the torque is transmitted from the side plates 3 and 4 to the hub 2 as described above, the operation will be described hereafter as if the torque is transmitted from the hub 2 to the side plates 3 and 4 in order to clearly described the operation.

Referring to FIG. 3, a hub 2 starts to torsionally turn or twist to transmit a torque in a direction of an arrow B, the flanges 13 and 14 in FIG. 7a which is integral therewith, start to rotate in the direction B' while compressing the spring 23. Initially in the torsion operation, the combined body A of the spacers 15 and 16 and the sub-plates 10 and 11 does not twist or torsionally turn with respect to the side plates 3 and 4. The relationship between the transmitted torque and the torsion angle in this operation is indicated by C1 in FIG. 8.

Figure 7B:
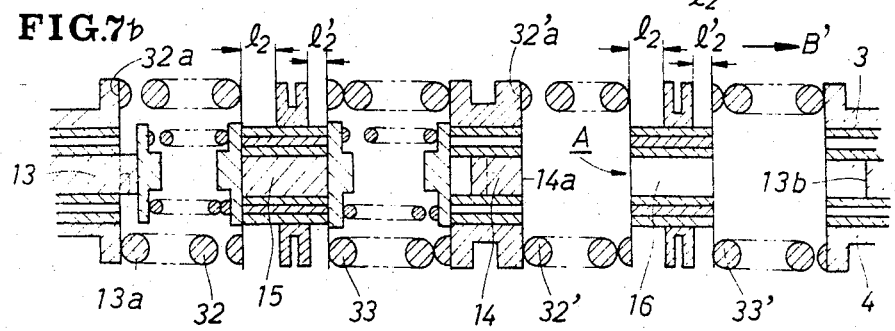

When the flanges 13 and 14 turn or travel the space 11 together with the hub 2, as shown in FIG. 7b, the edges 13a and 14a contact the ends 32a and 32'a of the springs 32 and 32'. Thereafter, the torque is transmitted from the flanges 13 and 14 through the springs 32 and 32' to the combined body A, and then, is transmitted through the springs 33 and 33' to the side plates 3 and 4. Thus, the springs 32 and 32' as well as the springs 33 and 33' are compressed, so that the flanges 13 and 14 torsionally turn with respect to the combined body A, and the body A also torsionally turns with respect to the side plates 3 and 4. The relationship between the transmitted torque and the torsion angle in this operation is indicated by D1 in FIG. 8.

Figure 7C:
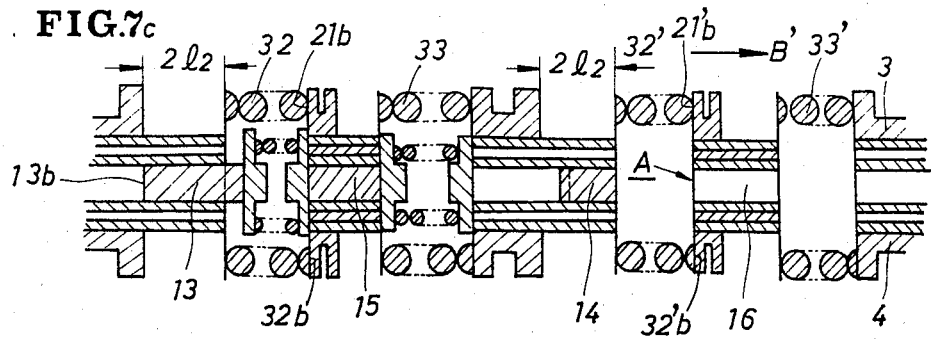

When the flanges 13 and 14 torsionally turn by a predetermined maximum angle in the direction B', as shown in FIG. 7c, the stop pins 5 and 5' (FIG. 3) contact the edges of the recesses 34 and 35, so that further torsion is prevented.

Figure 8:
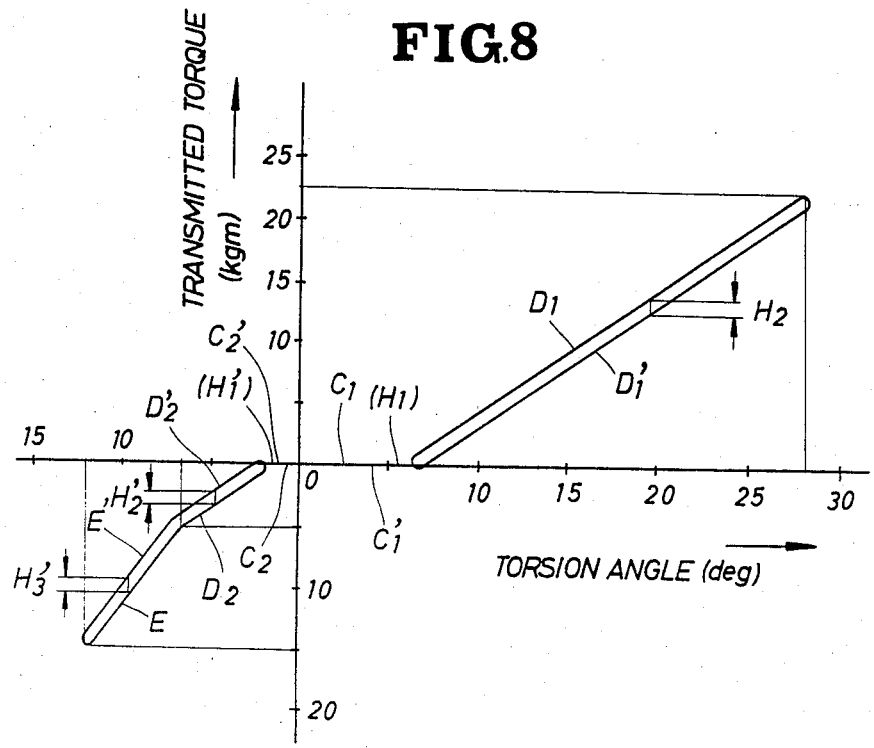
FIG. 8 is a graph illustrating a relationship between a transmitted torque and a torsion angle.

When the transmitted torque decreases, the torsion angle decreases along a line indicated by D1' and C1' in FIG. 8.

In the above first and second operations, the flange 12 turns with respect to the sub-plates 10 and 11, and friction occurs on the surfaces of the washers 40, so that a small first hysteresis torque H1 (not illustrated) is generated in the characteristic. In the second operation, the sub-plates 10 and 11 turn with respect to the side plates 3 and 4, and friction occurs also on the surfaces of the washers 41, so that a large hysteresis torque H2 is generated in the characteristic.

In FIG. 7a, when a hub 2 starts to transmit a torque in a direction opposite to an arrow B', the flanges 13 and 14 start to rotate in the same direction, which compressing the spring 24 (C2 in FIG. 8). Initially in this reverse torsion operation, the combined body A does not twist or torsionally turn with respect to the side plates 3 and 4 (C2 FIG. 8).

Figure 7D:
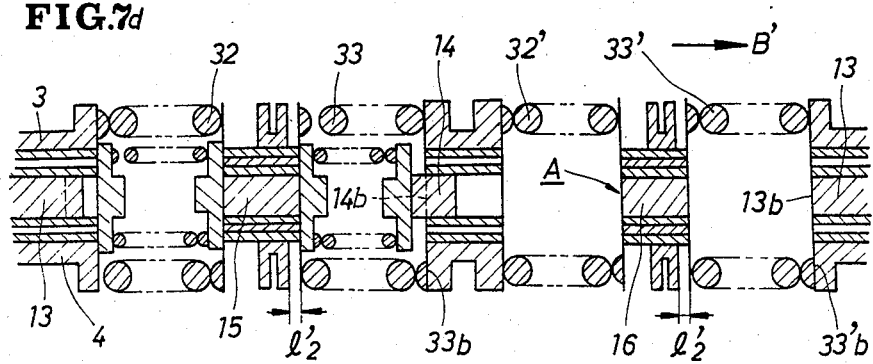
Figure 7E:
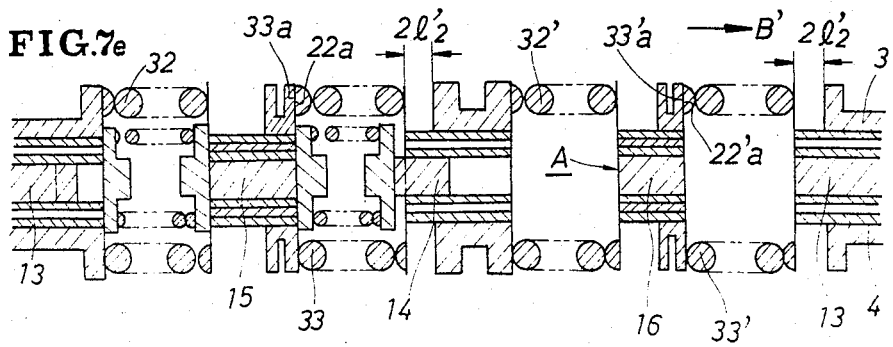

When the flanges 13 and 114 turn or travel the space 11', as shown in FIG. 7d, the edges 13b and 14b of the flange 13 and 14 contact the ends 33'b and 33b of the springs 33' and 33. Thereafter, the springs 33 and 33' as well as the springs 32 and 32' are compressed, so that the flanges 13 and 14 torsionally turn with respect to the combined body A, and the body A also torsionally turns with respect to the side plates 3 and 4 (D2 in FIG. 8). When the flange 13 and 14 turns the space 1'2 thereafter (FIG. 7e), the ends 33a and 33'a of the springs 33 and 33' contact the edges 22a and 22'a of the openings, so that the flanges 13 and 14 are connected to the side plates 3 and 4 directly through the springs 33 and 33'. When the flanges 13 and 14 further turns in the direction opposite to the arrow B', the springs 32 and 32' are not compressed and only the springs 33 and 33' are compressed, so that the torsional rigidity increases (E in FIG. 8).

Figure 7F:
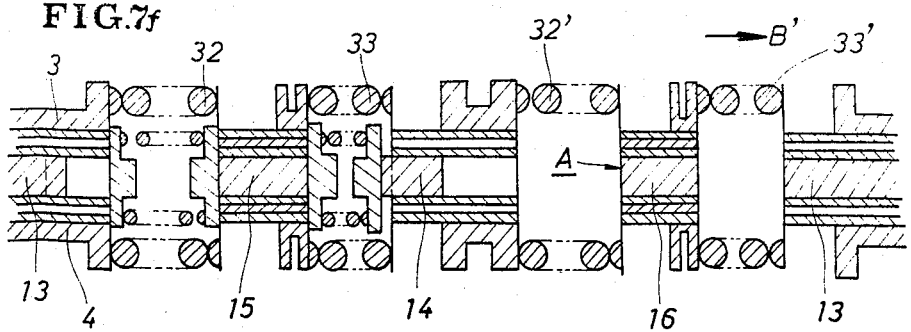

If the spring constant of the springs 32 and 32' is K1, the spring constant of the springs 33 and 33' is K2, and K1 is equal to K2, the total spring constant K of the springs 32, 32', 33 and 33' in the second stage or operation (D2 in FIG. 8) becomes $K1 \cdot K2/(K1+K2) = K\frac{1}{2}(=K)$, because these springs functions as a series. On the other hand, the total spring constant of them in the third stage or operation (E in FIG. 8) becomes K1. Therefore, the total spring constant in the third operation becomes twice as large as that in the second stage. FIG. 7f illustrates a condition in which the flanges turns to a limit in the direction opposite to the arrow B'.

When the transmitted torque decreases, the torsion angle decreases along a line indicated by E', D2' and C2' in FIG. 8.

In the above reverse operations, when the flange 12 turns with respect to the sub-plates 10 and 11 in the first operation, the friction occurs on the surfaces of the washers 40, so that a small first hysteresis torques H1' is generated in the characteristic. When the sub-plates 10 and 11 turns with respect to the side plates 3 and 4 in the second operation, the friction occurs on the surfaces of the washers 41, so that a large second hysteresis torque H2' is generated in the characteristic.

In modifications of the invention, small and soft springs may be disposed coaxially in the spring 32' or 33' between the flange 14 and the spacer 16 or between the flange 13 and the spacer 16. In FIG. 7c, the structures may be so constructed that the flanges 13 and 14 can further turn in the direction of the arrow B' after the ends 32b and 32'b of the springs 32 and 32' contact the edge 21b and 21'b of the openings. In this structure, three steps of the operations can be performed also in the turn in the direction of the arrow B'. The annular flange 12 in FIG. 3 may be eliminated so that the flanges 13 and 14 may be projected directly from the hub 2. As previously stated, the damper disc according to the invention may be used as a clutch disc of a wet type or a lock-up clutch of a torque converter.

According to the invention, as stated hereinbefore, since the pairs of the torsion springs are designed to be compressed in series between the hub and the side plates with the spacers therebetween, the maximum torsion angle can be large, e.g., 28 degrees in the positive direction. Since the hysteresis torque changes in accordance with the change of the torsion angle, the noise in the driving system can be absorbed effectively. That is, the noise during the idling of the engine can be effectively absorbed by the small first hysteresis torque, and the noise during the acceleration can be effectively absorbed by the large second or more hysteresis torque.

Although the invention has been described in its preferred form with a certain degree of particularly, it is understood that the present disclosure of the preferred form may been changed in the details of construction and the combination and arrangement of parts may be resorted to without departing from the spirit and scope of the invention as hereinafter claimed.

What is claimed is:

1. A damper disc of a long travel type comprising a hub adapted to be connected to an output shaft; a pair of circumferentially spaced flanges projecting radially outwardly from the outer periphery of the hub; a pair of side plates connected to a torque input portion, disposed at both sides of the flange and rotatably fitted around the hub; spacers circumferentially spaced to the flanges; sub-plates rigidly holding the spacers and rotatably fitted around portions of the hub between the side plates and the flange; a first friction member disposed between the flange and the sub-plate; a second friction member disposed between the sub-plate and the side-plate; a first spring always circumferentially connecting the flange and the sub-plates in a first torsion operation in which a relative torsion angle between the flange and the sideplates is lower than a predetermined value; second and third springs disposed circumferentially between the side plates and the flange with the spacers therebetween, the second and third springs being arranged to act in series and adapted to circumferentially connect the flange and the side-plates in a second torsion operation in which a relative torsion angle between the flange and the sideplates is larger than the predetermined value but less than another larger value of the relative torsion angle; and one of the second and third springs being connected between the flange and the sideplates during a third torsion operation where the relative torsion angle is greater than said larger value.

2. A damper disc of a long travel type comprising a hub adapted to be connected to an output shaft; circumferentially spaced flanges projecting radially outwardly from the outer periphery of the hub; a pair of side plates connected to a torque input portion, each side plate being disposed at a corresponding side of the flanges and rotatably fitted around the hub; spacers circumferentially spaced to the flanges; sub-plates rigidly holding the spacers and rotatably fitted around portions of the hub between the side plates and the flanges; a first friction member having a small friction force and disposed between the flange and the sub-plate; a second friction member having a large friction force and disposed between the sub-plate and the side plate; a first spring always circumferentially connecting the flange and the sub-plates; a second spring adapted to circumferentially connect the flange and the spacers in a second torsion operation in which a relative torsion angle between the flange and the side plates is larger than a first predetermined value; and a third spring adapted to connect the spacers and the side plate in the second torsion operation, the third spring also being adapted to connect the flange and the side plate in a third torsion operation in which the relative torsion angle between the flange and the side plates is larger than a second predetermined value which is larger than the first predetermined value.

3. A damper disc of claim 2 wherein said each spring is a compressible coil spring, said flanges and the spacers are disposed circumferentially alternately to each other, said second and third springs are disposed circumferentially alternately to each other between the flanges and the spacers, and said first spring is a spring having a small diameter and disposed coaxially in one of said second and third springs.

4. A damper disc assembly of the long travel type comprising:
   a hub adapted to be connected to an output shaft, having at least two radially projecting flanges which lie in a common radial plane, and defining a corresponding number of circumferential spaces therebetween;
   a plurality of spacers corresponding to the number of radially projecting flanges, each spacer being disposed in the common radial plane and being positioned between two of the radially projecting flanges;
   a pair of sub-plates rotatably fitted to the hub, rigidly holding the spacers, such sub-plate being disposed on a corresponding side of the common radial plane;
   a pair of side plates connected to a torque input means, each side plate being disposed on a corresponding side of the common radial plane with one of the sub-plates between the side plate and the flanges, each side plate having a plurality of circumferentially spaced openings;
   a first friction member having a small frictional force, being disposed between the flanges and one sub-plate;
   a second friction member having a large frictional force, being disposed between one side plate and one sub-plate;
   a first spring means disposed in one of the circumferential spaces, extending between one of the radial flanges and one of the spacers, being operable during torsional angles less than a first predetermined value;

second spring means disposed in the one circumferential space, extending between the one of the radial flanges and the one of the spacers with a first distance between the radial flange and one end of the second spring means, and supported at one end on the side plates in one of the circumferentially spaced openings of the side plates, and supported at the other end on the one of the spacers;

third spring means disposed in the one circumferential space, extending between the one of the spacers and a second one of the radial flanges with a second distance between the second one of the radial flanges and one end of the third spring means, one end supported on the side plates in one of the circumferentially spaced openings of the side plates, the second end supported on the associated spacer, the second and third spring means being operable during torsional angles greater than the first predetermined value and less than a second predetermined value, the third spring means being operable during torsional angles greater than the second predetermined value.

5. The damper disc of claim 4 wherein each of the radial flanges and the spacers has a notch which receives a stop pin connecting the two side plates, so that engagement of the stop pin with the notch limits the maximum torsional displacement between the hub and the side plates.

6. The damper disc of claim 4 wherein the first distance is greater than the second distance so that the damper disc has different operating characteristics for positive and negative torsional displacements.

* * * * *